June 10, 1941.  G. T. BALFE  2,245,122
APPARATUS FOR FEEDING AND CUTTING SHEET MATERIAL
Filed Nov. 11, 1935  9 Sheets-Sheet 1
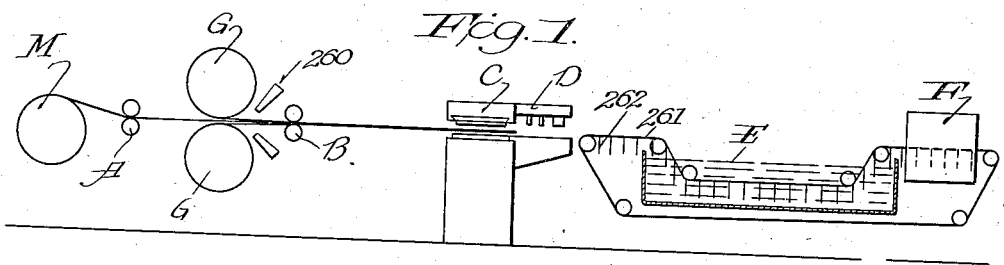
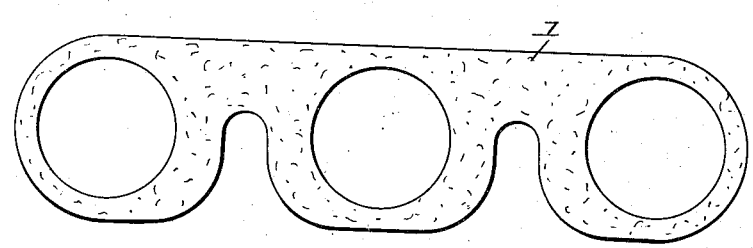
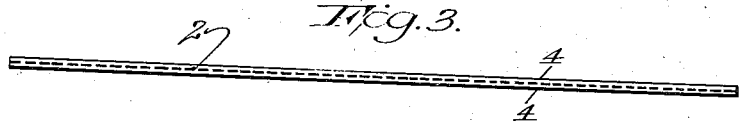
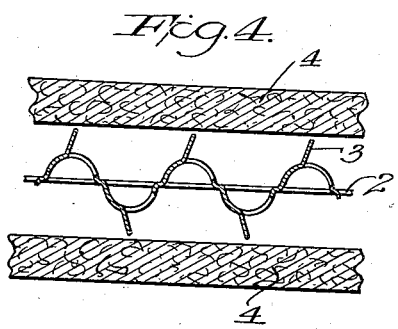
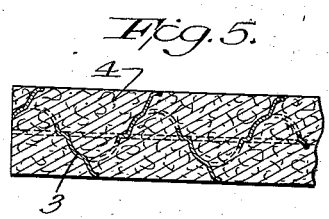
Inventor
George T. Balfe.
By Cushman, Darby, & Cushman
Attorneys

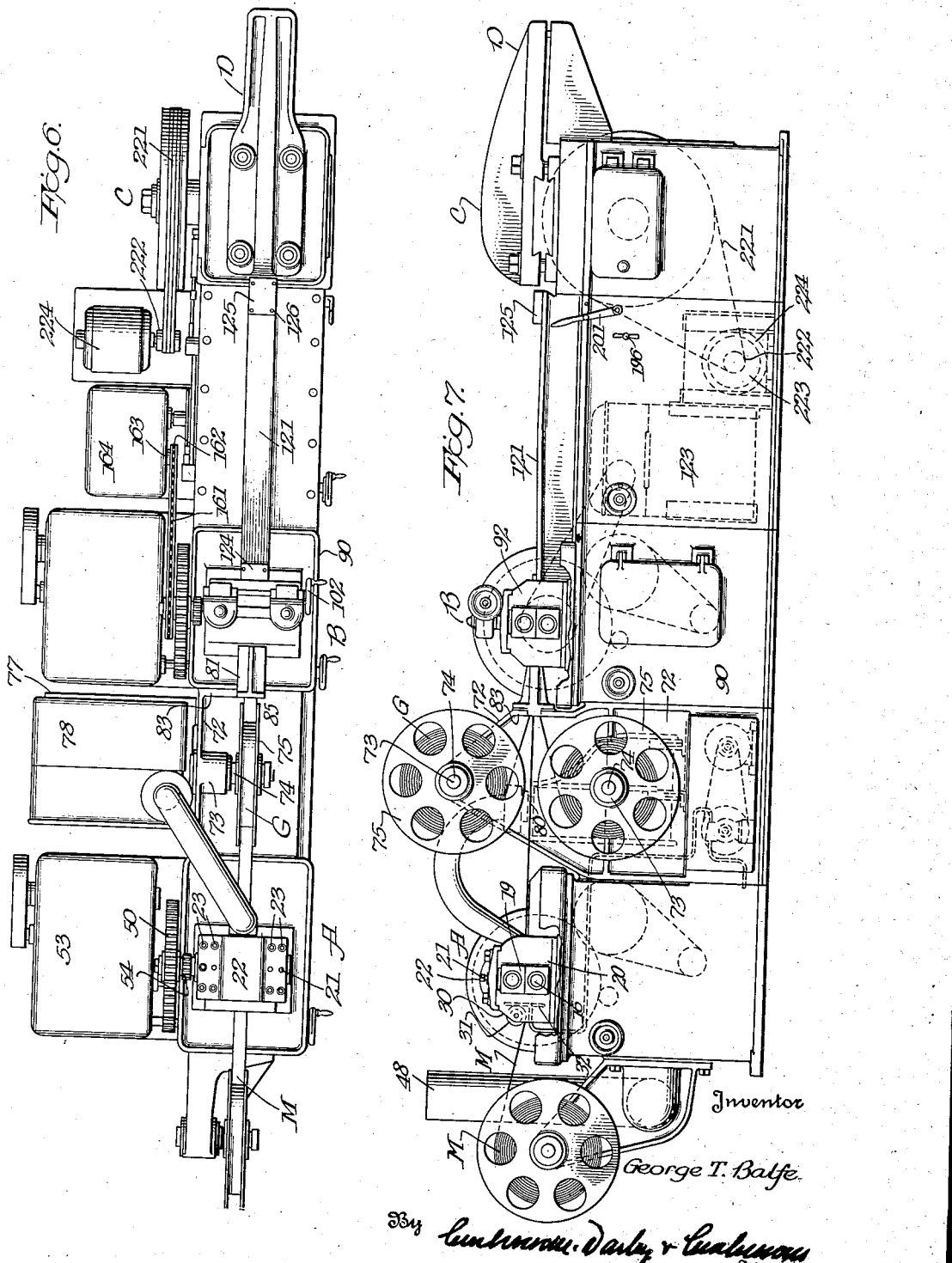

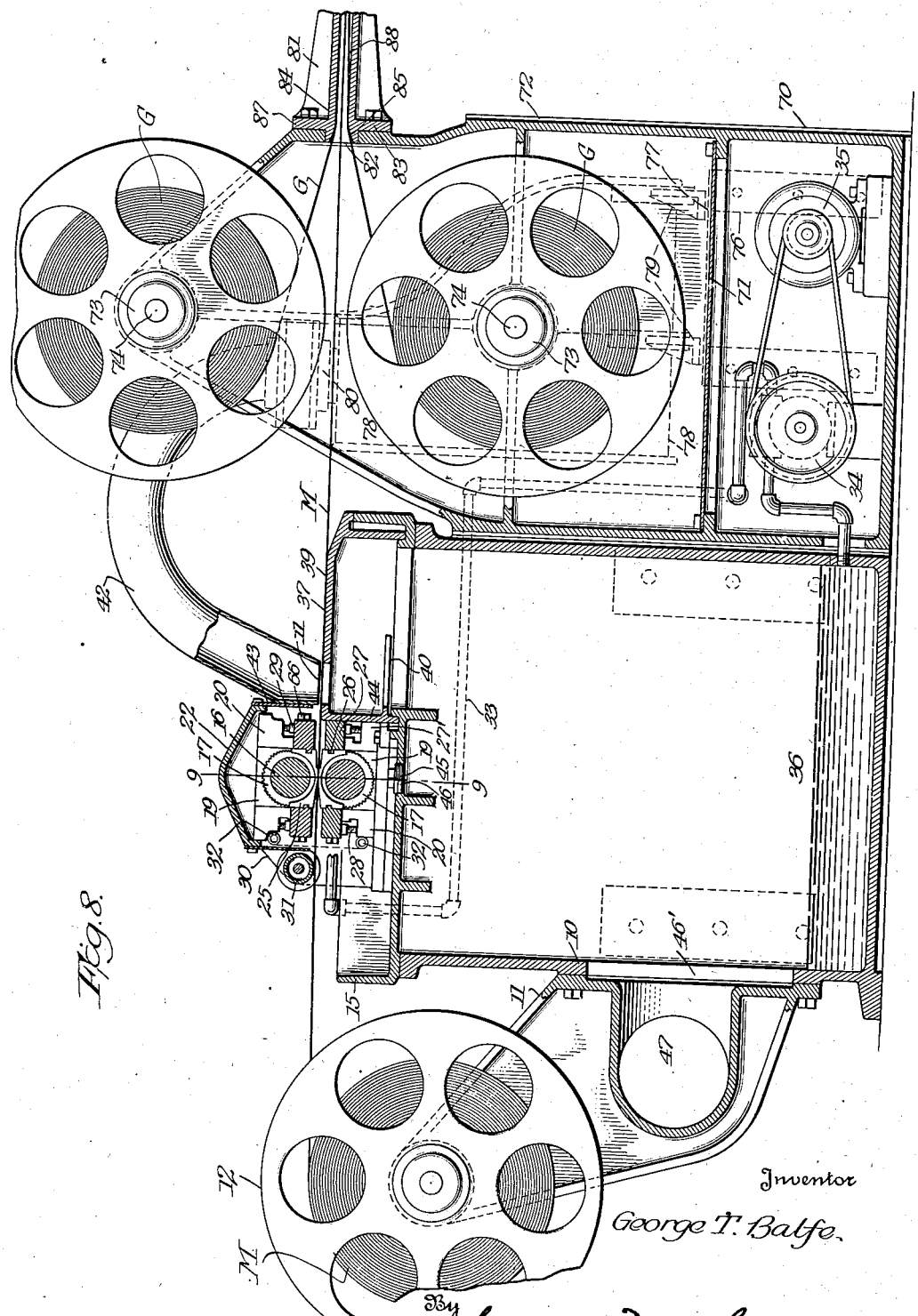

June 10, 1941.  G. T. BALFE  2,245,122
APPARATUS FOR FEEDING AND CUTTING SHEET MATERIAL
Filed Nov. 11, 1935  9 Sheets-Sheet 4
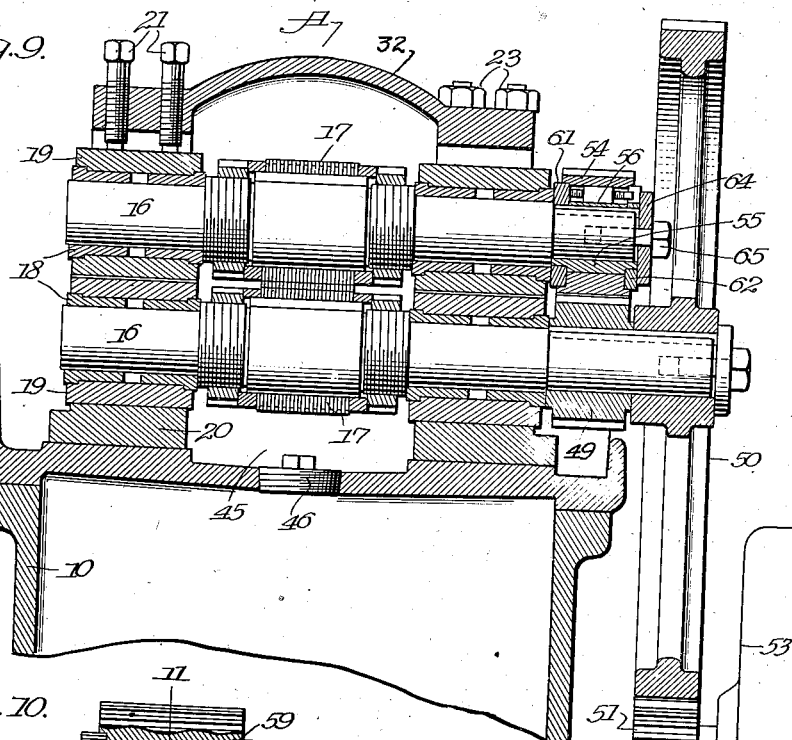
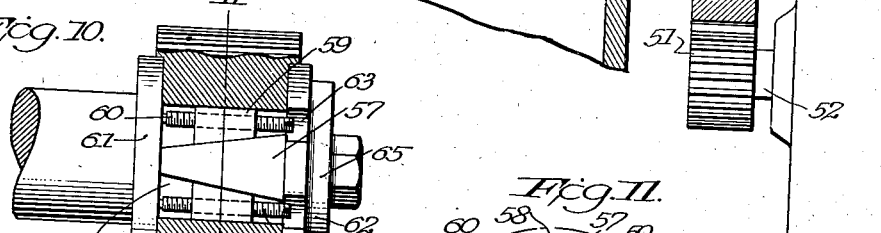
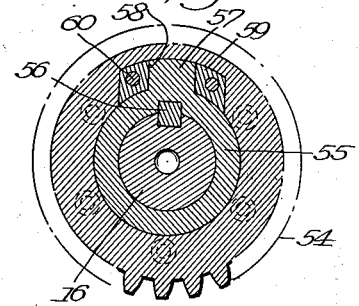
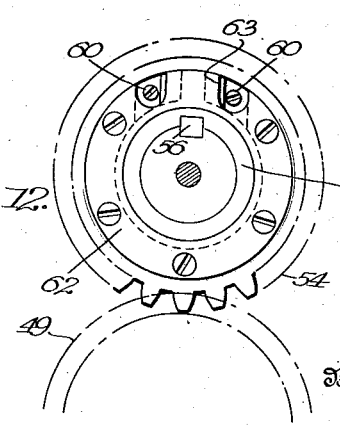
Inventor
George T. Balfe

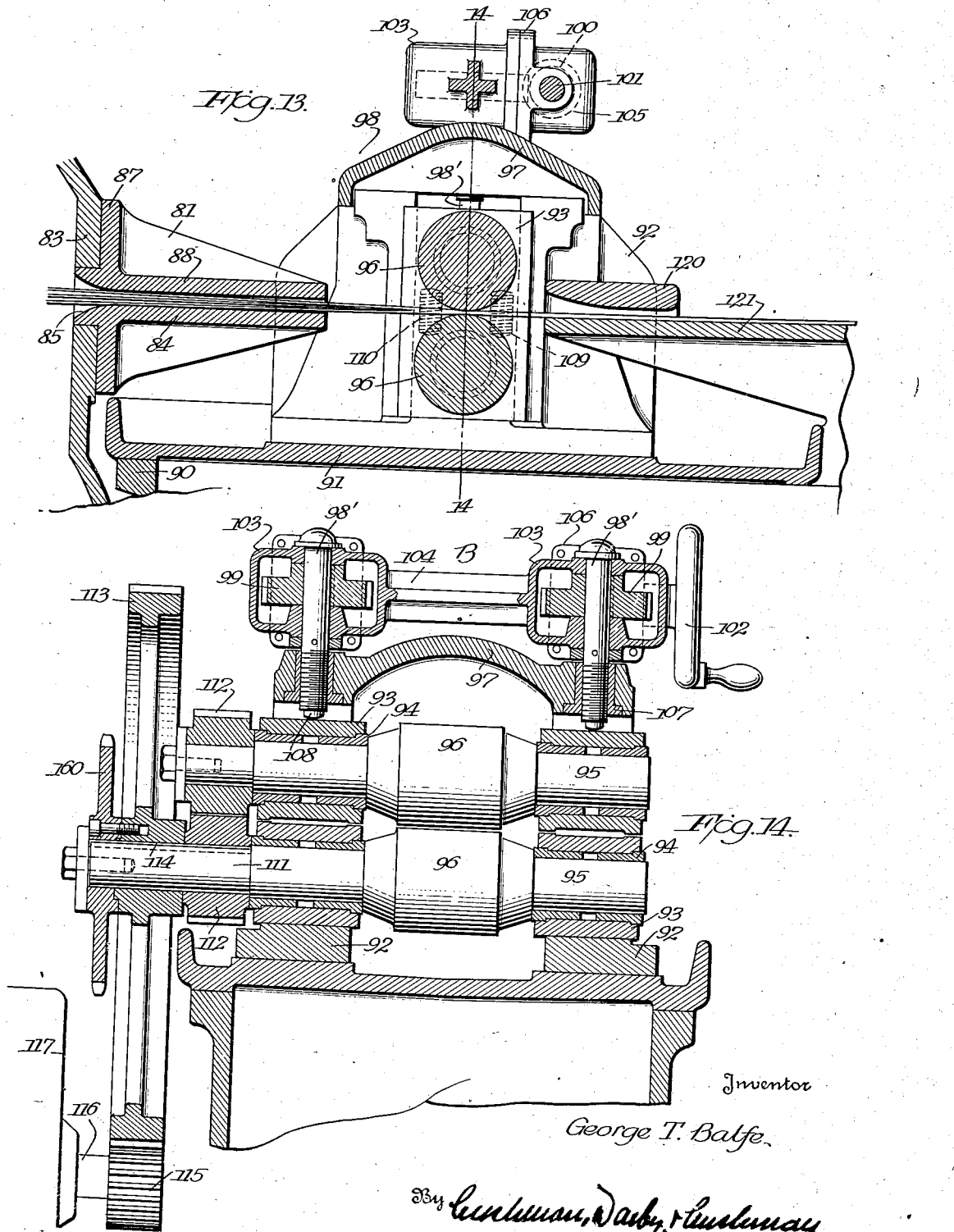

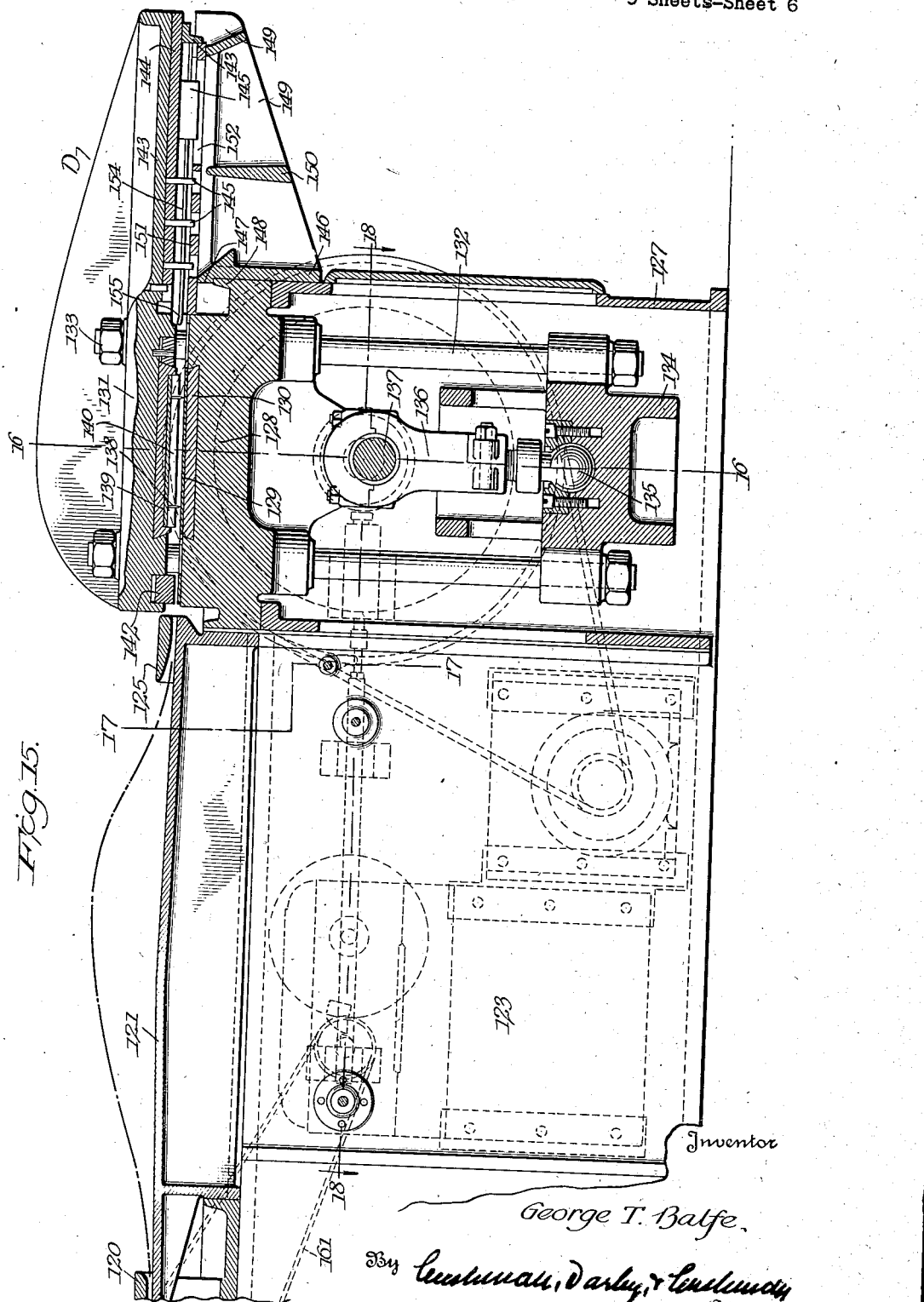

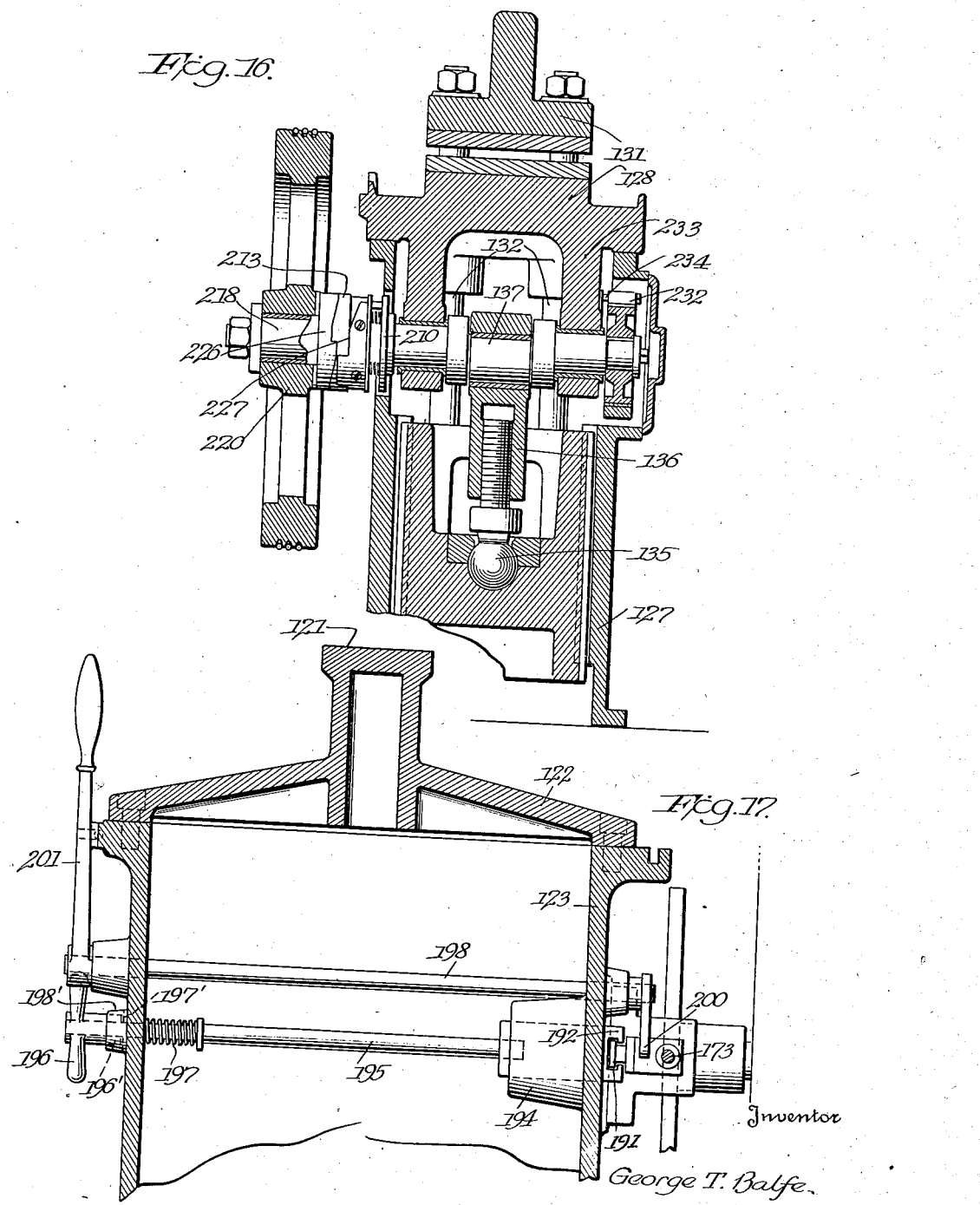

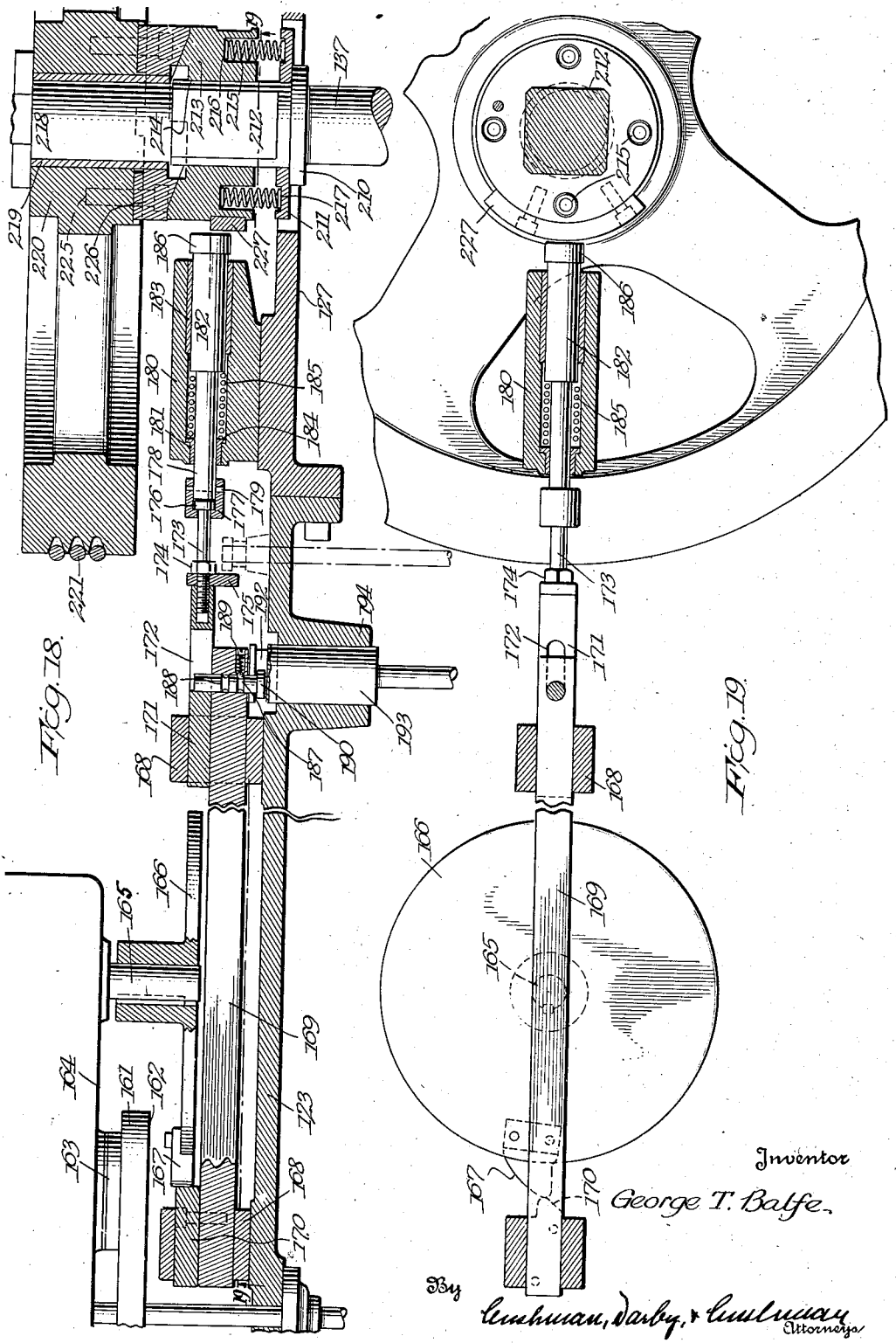

June 10, 1941.                G. T. BALFE                2,245,122
APPARATUS FOR FEEDING AND CUTTING SHEET MATERIAL
Filed Nov. 11, 1935            9 Sheets-Sheet 9

Inventor
George T. Balfe
By Cushman Darby & Cushman
Attorneys

Patented June 10, 1941

2,245,122

UNITED STATES PATENT OFFICE 2,245,122

APPARATUS FOR FEEDING AND CUTTING SHEET MATERIAL

George T. Balfe, Detroit, Mich., assignor to Detroit Gasket & Mfg. Co., Detroit, Mich., a corporation of Michigan Application November 11, 1935, Serial No. 49,304

2 Claims. (Cl. 164—22)

This invention relates to a process and apparatus for the manufacture of gaskets.

Primarily the invention provides for a continuous manufacture of gaskets from strip material whereby the blank strips are fed in at one end of the machine and finished gaskets are delivered at the opposite end of the machine.

The invention is particularly useful in the manufacture of gaskets in accordance with my Patents Nos. 1,776,140, September 16, 1930, and 1,927,450, September 19, 1933, but can be used for manufacturing many other types of gaskets as well as for the manufacturing of a variety of articles.

One particular feature of the invention resides in providing continuous means for (1) forming a metal strip so that the same is provided with projections, (2) combining with this metal strip on one or both sides thereof a layer of suitable gasket material, also fed as a strip, to produce a laminated structure from which the gaskets or other objects may be suitably stamped, and (3) stamping out gaskets from the laminated material and stripping the same therefrom.

A further object of the invention is to provide a machine which will occupy a relatively small space and in which the several operating mechanisms are capable of independent control and adjustment without removal from the machine.

An additional object of the invention resides in providing a machine which will operate upon strip material of varying widths and wherein not only is time saved by reason of the continuous and uninterrupted manufacture, but the width of the strip material may be relatively narrow with respect to the width of the articles being formed whereby a minimum of material wastage takes place.

The process of the invention includes the continuous steps of forming the metal, combining the same with a gasket material layer or layers, applying a layer of non-sticking material, e. g., graphite, to the gasket material, stamping out the gaskets and subsequently giving the gaskets a treatment with a protecting liquid and baking operation substantially as described in my copending application, Serial No. 648,691, filed December 23, 1932, of which this application is a continuation-in-part.

Referring to the drawings—

Figure 1 is a diagrammatic view of my improved machine including also a dipping tank and drying oven in which the finished gaskets are given a final treatment;

Figure 2 is a top plan view illustrating by way of example, a gasket;

Figure 3 is a side elevation of a gasket;

Figure 4 is a view of a gasket in accordance with my Patent No. 1,776,140 before the gasket material and metal layers are combined;

Figure 5 is a view showing the gasket of said patent with the layers of Figure 4 combined;

Figure 6 is a top elevation of the machine;

Figure 7 is a side elevation of the machine;

Figure 8 is a detail view partly in section showing the first operation of forming the metal and the feeding of the gasket material onto the metal layer for combination therewith;

Figure 9 is a sectional view on the line 9—9 of Figure 8 showing the means for forming the metal with struck-up projections;

Figure 10 is a top plan view partly broken away and partly in section of the upper gear of the machine shown in Figure 9;

Figure 11 is a sectional view on the line 11—11 of Figure 10;

Figure 12 is a front elevation of the upper gear of the machine shown in Figure 9, the lower gear being shown in dotted lines;

Figure 13 is a longitudinal sectional view showing the manner in which the respective layers are combined and the mechanism for accomplishing the combining operation;

Figure 14 is a sectional view on the line 14—14 of Figure 13;

Figure 15 is a longitudinal sectional view showing the apparatus for stamping and stripping the laminated material, this view also illustrating one means, e. g., a table for permitting continuous feeding of the strip material to the intermittently operated stamping and stripping apparatus;

Figure 16 is a cross section on the line 16—16 of Figure 15;

Figure 17 is a sectional view on the line 17—17 of Figure 15;

Figure 18 is a sectional view on the line 18—18 of Figure 15;

Figure 19 is a cross section on the line 19—19 of Figure 18;

Figure 20:
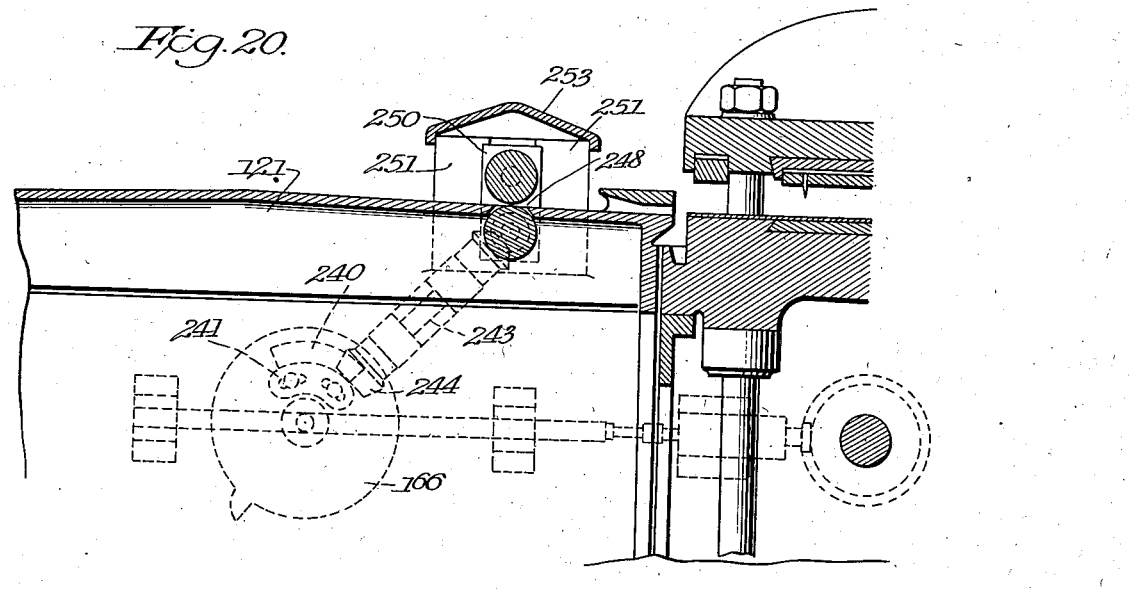
Figure 20 shows a supplementary and positive feeding means provided for intermittently feeding the strip material to the stamping and stripping instrumentalities.

Referring to the drawings, I have illustrated diagrammatically in Figure 1 the process of the invention. Preferably, the operation proceeds in a straight line and continuously whereby the metal strip is formed as shown in Figure 4 in accordance with my United States Patents Nos. 1,843,438, February 2, 1932; 1,927,791, September 19, 1933; and 2,000,208, May 7, 1935, and combined on one or both sides thereof with a layer of suitable cushion gasket material such as asbestos, as shown in Figure 5; the laminated material is stamped to gasket form, the gaskets stripped and dipped in a suitable protective liquid and then heated or baked, all as set forth in my United States patent application Serial No. 648,691. If desired, the cushion gasket material in the roll is coated with a non-sticking material layer, such as graphite, or it may be so coated prior to or after the combining operation or after the stamping operation. Again, the roll of cushion gasket material is coated with the graphite as it is fed from the roll to the combining apparatus, all as described in my aforesaid application.

Referring to Figures 1, 6 and 7, the cutting instrumentality for forming the metal sheets is generally in accordance with my aforesaid patents and is indicated at A. The combining instrumentality is indicated at B, the stamping instrumentality at C, with which is combined the stripping instrumentality D. The saturating tank is indicated at E and the oven at F. The metallic strip material is indicated at M, and the cushion gasket material at G.

Referring to Figure 2, I have, for purposes of illustration, shown one type of engine gasket, which is simply exemplary of a wide variety of sizes, shapes and thicknesses of single layer and laminated products of varying composition and useful for innumerable purposes which may be prepared by the present process and apparatus. The gasket illustrated at I in Figure 2 is in accordance with my United States Patents Nos. 1,776,140, September 16, 1930, and 1,927,450, September 19, 1933, in that it comprises a metallic insert 2 having struck-up projections 3, which, as shown in Figure 5, are embedded in layers of gasket material 4, by pressure, so that the ends of the projections 3 come to the surface of the gasket and are bent over to lie within the plane of the surface of the gasket. If desired, and as set forth in said patents, the gasket will comprise but a single layer of cushion material 4 united to one side of the metal insert 2.

Referring to Figures 6 and 7, I have illustrated a machine assembly and the base of the machine may consist of a single metal casting or a plurality thereof suitably connected together as by bolts. As previously stated, the continuous operation preferably proceeds in a straight line.

*The sheet metal forming operation*

Referring to Figure 8 particularly, I have indicated at 10 a casing or housing at one end of the machine which, on one side, is provided with a bracket 11 in which is revolubly supported the spool or reel 12 for the roll of metallic strip material M.

The housing 10 is provided with a suitable flanged cover 15 having a raised or thickened portion upon which is supported and secured as by bolts a metal forming apparatus generally similar to that shown and described in my United States Patents Nos. 1,843,438, February 2, 1932; 1,927,791, September 19, 1933; and 2,000,-208, May 7, 1935.

Referring to Figures 6, 7, 8 and particularly Figure 9, it will be noted that the arbors 16 carrying the cutting instrumentalities 17 are supported at their ends in bearings 18 which in turn are supported in bearing blocks 19, the latter disposed in the slots of upstanding U-shaped housings 20, one on each side of the machine and whose bases rest on the said raised and thickened portion and are secured thereto. As shown in Figure 9, the bearing blocks 19 are superposed one upon the other and the upper bearing blocks carrying the upper arbor are adjustable in that they may slide within the housings 20 to accommodate various thicknesses of metal. This adjustment is controlled by means of screws or bolts 21 carried by a cover member 22 which is bolted at its ends to the top of each of the slotted housings 20, as shown at 23. The bolts 21 may be raised or lowered so that their ends engaging the blocks will limit the movement thereof within the slotted housings 20.

The anvil members 25 are also adjustably mounted and, referring to Figure 8, these members are provided with slots within which are engaged projections 26 of transversely extending bars 27. These bars are adjustably supported for vertical movement in each of the housings 20 by means of threaded rods 28 having their ends respectively engaged in a bar 27 and an adjacent internal lateral extension 27' of the housing 20. The bars are moved relative to each other in adjusted relation so as to properly position the anvils with respect to the cutting members, by turning the heads 29 or other suitably squared portions formed on the threaded members 28. A bracket 30 is preferably integrally formed with each of the slotted housings 20 at the ends adjacent the reel 12 and carry a flanged guide roller 31 beneath which the metal strip material M is passed. Means for supplying a lubricant and cooling fluid are provided, consisting of suitable spray heads 32 adapted to direct a spray of cooling lubricant such as oil upon the cutting instrumentalities, the spray being supplied from a pipe 33 which in turn leads to a pump 34 operated by a motor 35, the pump communicating with a self-contained reservoir 36 in the lower end of the housing 10. A supplemental cover 37 is fitted over the top of the housing 10 upon the cover 15 and has an opening 38 therein, as well as a flat table-like portion 39 over which the metal strip which has been operated upon by the cutting instrumentality is continuously passed. The cover member 37 also has a suitable integral baffle member 40 as shown. Associated with the opening 38 is the open end 41 of a blast pipe 42 whereby air is blown upon the formed metal strip immediately it passes from the cutting instrumentality so as to clean the same, as well as remove any lubricant or cooling fluid which may have adhered to the strip during its passage through the cutting instrumentality. The lubricant and cooling fluid is thereby forced back into the housing 10 to the reservoir 36 and the baffle 40 acts to prevent the blast from the blast pipe 42 causing any ebullition of lubricant present in the reservoir 36. At each side of the cutting instrumentality there is disposed a downwardly extending shield member 43 which acts to direct the lubricant spray onto the moving parts of the cutting instrumentality and prevent any loss of the same through being directed outwardly of the machine. In this connection, it is to be noted that the supplemental cover 37 at one end is provided with the integral flange 44 which also acts as a shield for this purpose. Lubricant collected within the flanged cover 15 is returned to the reservoir 36 by means of the opening 45 closed by the threaded plug 46.

The casing 10 is provided with an opening 46' communicating with an outlet 47 formed integral with the bracket 11 and which has connected to it a stack 48 whereby air and gases within the chamber 10 are removed.

Referring to Figure 9, there is fixed to the lower arbor a small gear 49 and a large gear 50. The large gear is operated through the medium of a small gear 51 carried by the shaft 52 of a suitable speed reducing transmission 53, which in turn is operated by any suitable prime mover such as an electric motor.

Referring to Figures 10, 11 and 12, there is fixed to the upper arbor a gear 54 which meshes with the gear 49. This upper arbor 16, however, is provided with a bushing 55 keyed to a reduced end portion of the arbor 16 at 56, which bushing has a substantially wedge-shaped projection 57 disposed in an internal slot 58 in the gear, as shown in Figure 11. Mounted in the recess 58 on each side of the wedge member 57 are movable wedges 59 which are adjustably mounted by screws 60. Surrounding the reduced end of the arbor adjacent the bearing 18 is a collar 61 against which the inner ends of the screws bear and a similar collar 62 is provided at the opposite end having openings 63 therein by which access to the screws for the purpose of turning them is attained, as shown in Figure 10. By adjusting the screws 60, the wedges 59 cause the gear to shift relative to the bushing 55 whereby the gear on the upper arbor is adjustable relative to the gear on the lower arbor so that both gears operate simultaneously and present the cutting instrumentalities to the sheet in the proper relation to produce the up-struck tangs, as shown, for example, in Figure 4. A cover plate 64 is bolted to the reduced end of the upper arbor as at 65 for maintaining the aforesaid assembly of the gear 54.

Referring to Figure 8, the adjusting screws 28 for adjusting the bars 27 and the anvils carried thereby are fixed in their adjusted position by means of set screws 66 threaded into the bars and having their ends engaging the threaded portions of the respective screws within the bars.

The prime mover, which is preferably an electric motor and associated with the speed reducer transmission, is independently controlled by any suitable type of electric switch so that if desired, the forming instrumentality A can be shut off independently of the other operating mechanisms.

It will be observed that by reason of the motor driven cutting instrumentality, the metal strip M is withdrawn from the reel 12, passes under the flanged roller 31, and is acted upon by the cutting instrumentality and then subjected to the blower. By reason of the rotation of the cutting members, the formed metal strip is moved over the table 39 and propelled in feeding relation to the combining apparatus. In other words, the cutting instrumentality A acts to withdraw the strip metal from the reel, as well as to propel it from the cutting instrumentality to the combining means.

Combining apparatus

Referring to Figures 6, 7 and 8, there is disposed adjacent the housing 10 a casing or housing 70 in which is disposed the pump 34 and motor 35 previously described. This housing is provided with a suitable detachable cover 71, and with an upstanding bracket portion 72 integral with one side wall of the casing. Mounted on the bracket 72 are spaced integral bosses 73 which support shafts 74 upon which are revolubly mounted reels 75 carrying rolls of cushion gasket material G. One or more reels may be so positioned to supply a cushion layer for one or both sides of the metal strip M. Fixed to the side of the housing 70 adjacent the bracket 72 are brackets 76 upon which are secured a table 77 for the fan blast housing 78. This housing 78 is secured to the table by bracket connections 79 as shown in Figure 8. Mounted within the housing 78 is a suitable blast mechanism not shown but preferably consisting of a fan operated by a prime mover such as a motor and an air blast is continuously created which is directed through the outlet 80 in the housing to the conduit 42.

The gasket strip material in the roll may have a coating of suitable non-sticking material such as graphite thereon, or such coating may be supplied as the strip material G leaves the reels by any suitable spray depositing means, as shown, and as illustrated and described in my said copending application. The strip cushion material G from one or both reels, as well as the formed strip M, are threaded into a suitable guide indicated as a whole at 81. This threading or guiding means comprises the opening 82 which, as shown in Figures 6, 7, 8 and 13, is formed in a bracket 83 extending laterally from the bracket 72, and a feed throat 84 having a tapering entering portion 85 which is disposed in the opening 82. The flanges 87 of the throat are bolted to the laterally disposed flange 83 in any suitable manner to fix the throat in position and the length of the throat will be varied as required to present the strips in closely associated relation to the combining apparatus B. The opening 88 of the throat will of course be of a dimension to bring two or more strips suitably close together and guide them in registered relation to the combining instrumentality B.

The combining instrumentality B is shown in Figures 13 and 14 and is supported upon a suitable housing or casing 90, as shown in Figure 7. The housing 90 is provided with a cover plate 91 to which is secured a pair of spaced substantially U-shaped members 92. Disposed within the slots in said members, for vertical sliding movement, are bearing blocks 93 having therein journals 94 within which rotate the shafts 95 carrying the combining rollers 96. A cover 97 is secured at its ends, as by bolts 98, to the tops of the U-shaped members.

The combining rollers 96 are adjustably mounted, in that the upper roller may move vertically to accommodate various thicknesses of material and produce various pressure effects whether the material be either a single layer or laminated. This adjusting means consists of screws or bolts 98' carrying spiral gears 99 which are engaged by spiral pinions 100 on the shaft 101, the latter rotated by means of the hand wheel 102. This construction provides a self-locking means in any adjusted position of the upper combining roll thereby producing a uniform pressure effect. It is to be noted that the gears 99 and the bearings for the screws 98' are mounted in suitable housings 103 which are integrally connected by the bar 104. The shaft 101 and its pinions are also enclosed in suitable housings 105 which are bolted or otherwise secured to the housings 103, as shown at 106. The screws move in suitable threaded bushings 107 fixed in the cover member 97 and, their ends 108 being vertically adjustable, the upper roller 96 may move vertically relative to the lower roller 96 to accommodate various thicknesses of the material and produce the required combining pressure in accordance with the adjusted position of the ends of the screws with respect to the upper bearing blocks 93.

Referring to Figure 13, there is disposed between the bearing blocks 93 a plurality of springs 109 which are housed in suitable recesses 110 in the bearing blocks. These springs are preferably of the coil type and normally act to separate the bearing blocks and the rollers 96 carried thereby. To adjust the rollers for compressing and/or combining any thickness of material or laminations, the hand wheel 102 is operated to raise or lower the screws 98' so as to accurately define and limit the distance between the respective rollers 96 and control the compression effect, it being noted that the springs will always cause the upper bearing blocks to engage the ends of the screws 98'.

Thus, a single layer of material being acted upon of any desired thickness may be compressed by the rollers 96, or a layer of strip material M and one layer of cushion material G, or a layer of strip material M and cushion material layers G on each side thereof may be operated upon and combined as shown in Figure 5. The ends of shafts 95 are reduced as shown at 111 and carry gears 112 which are disposed in interengaging relation. A large gear 113 is fixed to the extended reduced end 111 of the lower roller shaft 95, as shown at 114. This gear 113 is rotated by means of a gear 115 mounted on a shaft 116 of a suitable speed reducer transmission mechanism 117 operated by any suitable prime mover such as an electric motor. This prime mover or motor is independently operable so that the combining mechanism can be independently operated or shut off, as desired.

The several layers from the feeding and combining throat 84 are directed between the rolls 96 and the operation thereof acts to compress and/or combine, for example, a formed metal strip material layer and one or more layers of cushion gasket material as shown in Figure 4. It is to be noted that the feeding of the cushion gasket material strip from one or more of the reels 75 is accomplished by the rolls 96 acting thereon and these rolls 96 thereafter act to propel the laminated strip, as shown in Figure 15, to the gasket stamping and stripping instrumentality. The combined or compressed strip of either single layer or laminated structure is fed from the combining rolls through the outlet throat 120 secured to and extending from a table 121 integral with a cover plate 122 bolted to a suitable housing 123 as shown in Figures 13, 15 and 17. The throat 120 has its entrant end disposed in close proximity to the combining rolls 96, as shown in Figure 13, so as to receive the compressed and/or combined strip and move it across the relatively narrow raised table 121 to the stamping instrumentality. The throat 120 is secured to the table by screws 124.

Stamping and stripping apparatus

The strip material discharged by the outlet throat is propelled over the table 121 which, at its opposite end has secured thereto a guiding throat 125 as by screws 126. This table 121 is of a length whereby the intermittent action of the stamping and stripping apparatus will not interfere with the continuous feeding and forming of the metal strip and the continuous feeding and compressing and/or combining of the layers of cushion material therewith. That is to say, the distance between the combining instrumentality and the stamping instrumentality afforded by the table 121 allows for a supply of the strip material to be built up and flex without retarding the operation of either mechanism.

The stamping and stripping apparatus is best illustrated in Figures 15, 16, 17, 18 and 19. Referring to Figures 15 and 16, the housing 127 disposed adjacent the housing 123, carries at its upper end a fixed head 128 upon which is mounted a bed plate 129 and die plate 130, the latter being of resilient flexible sheet metal and the bed plate 129 being of metal, or, if desired, some resilient material, the construction being substantially similar to that described in my copending applications, Serial Nos. 690,740, filed September 23, 1933, and 15,878, filed April 11, 1935. Mounted to reciprocate with respect to the head 128 and plate 129 and 130 is a head 131 carried by a plurality of rods 132 bolted thereto as at 133, and slidably extending through openings in the fixed head 128. The rods 132 are bolted in a suitable cross-head 134, which cross-head is united by a ball and socket connection 135 and connecting rod 136 with a crank shaft 137. The reciprocating head 131 carries a stamping instrumentality or knife 138 mounted on a resilient and flexible metal die plate 139 and bed plate 140 and is substantially similar to that shown and described in my above said copending applications. The knife 138 has a contour or contours in accordance with the particular gasket or other products to be stamped from the sheet material. Carried by the head 128 at the end thereof adjacent the throat 125 is a relatively narrow strip or plate of metal or rubber 141 which cooperates with a slidably mounted or resilient block 142 carried in a recess in the movable head 131 whereby, in the operation of the device, the material being cut or stamped will be clamped between the respective members 141 and 142 during the cutting operation. The movable head 131 has an integral extension 143 to which is detachably secured as by bolts, a plate 144 carrying stripper members or knock-out plugs 145. The purpose of these knock-out members is to engage cut-out portions of the strip and remove such cut-out portions including the gaskets from the stamped laminated sheet.

A bracket 146 is detachably bolted to the housing 127 and has a flange 147 fitting over the adjacent edge 148 of the fixed head 128. This bracket is formed with a plurality of chutes 149, defined by walls 150. Carried by the bracket 146 and detachably secured thereon as by bolts is a stripper plate 151 having openings 152 therein registering with the knock-out members 145 and of a size to permit the material so knocked-out by the members to pass therethrough into the chutes 149.

Secured at one end of the plate 144 on the reciprocating head is a transversely extending knife 153 for shearing the waste strip material. Extending longitudinally and secured along each edge of the stripper plate 151 are guide members 154 between which and the adjacent surface of the plate are slidably received the opposite edges of the strip material. These guide members 154 have flared entrant portions 155, all as shown in Figure 15. The advantage of the guide members 154 resides in their sustaining the strip material while it is being acted upon by the knock-out members 145, whereby the strip material after it has been stamped is properly supported for the operation of the knock-out devices and at the same time is guided in its sliding movement through the stripping apparatus. It will be understood that waste pieces will be knocked out and discharged to the first chute 149, the completed gaskets knocked out recovered through the second chute 149 while the sheared waste material is discharged through the third chute 149, reading from left to right.

Referring to Figures 6, 14, 15 and 18, there is fixed to the reduced end 111 of the lower shaft 95 of the combining mechanism B a sprocket wheel 160. A suitable chain 161 or other driving means engages the sprocket wheel 160 and a second sprocket wheel 162 carried by a shaft 163 of a suitable speed reducer transmission apparatus 164, whereby rotation of the sprocket wheel 160 is transmitted to the apparatus 164. The speed reducer transmission apparatus 164 has a shaft 165 to which is fixed for rotation a disc 166 having secured thereto as by screws a cam 167. Carried by the casing 123 at one side thereof, as shown in Figures 6 and 18, and suitably secured thereto, are guide members 168 in which is slidably mounted a bar 169 having secured at one end thereof a cam 170 cooperating with the cam 167 on the rotating disc 166. At the opposite end, the adjacent guide member 168 slidably receives a second bar 171 having a slot 172 therein. Threadedly connected to the bar 171 at one end thereof is a rod 173 carrying a nut 174, between which and the end of the bar 171 is fixed an extension plate 175 for a purpose which will later be described. The rod 173 has an enlarged integral head 176 disposed in and confined by a coupling member 177, and said head 176 is rounded or cylindrical so that the rod may rotate within the coupling member for adjusting the threaded connection of the rod 173 with bar 171. Also secured to the coupling member 177 is a stem 178, as by a pin 179, and said stem 178 projects within a hollow guide 180 secured to the side of the casing 127. This guide has a bushing 181 receiving the reduced end of the stem 178, and the latter is enlarged, as at 182, and engages in a bushing 183 in said guide. Between the enlarged portion 182 of the stem 178 and the reduced wall 184 of the opening in the guide member 180 is positioned a coil spring 185 acting to project the stem 178 outwardly of the guide, toward the right. At its exposed end, the enlarged portion 182 of the stem carries a roller 186 freely rotatable on said stem.

The bar 169 has slidably mounted therein at one end a pin 187 provided with grooves 188 in which is selectively engaged a spring pin latch 189, mounted in the bar 169, as shown in Figure 18. Referring to Figure 17, the head 190 of the pin 187 is slidably held in a groove 191 defined by the shoulders 192, integrally extended from one end of a barrel-shaped member 193 which is mounted for sliding movement in a boss 194 on the adjacent wall of the housing 123 and is connected to a rod 195 extending across the housing and through the opposite wall thereof, and carrying a handle 196. By pulling out on the handle 196 against the action of the spring 197, the shoulders 192 defining the groove 191 engage and retract the pin 187, whereby it is disengaged from the slot 172. Similarly, by pushing in on the handle 196, the pin is engaged in said slot.

As shown in Figure 18, the pin 187 extends into the slot 172, and the cam members 167 and 170 are in engagement, whereby the bar 169 is moved to the left, carrying with it the bar 171 and associated parts by reason of the engagement of the end of the pin with the wall of the slot 172. When the cam members 167 and 170 are out of engagement, the spring 185 will retract the stem 178, the rod 173, the bar 171, and by reason of the pin 187 having its head 190 freely longitudinally slidable in the groove 191 defined by the shoulders 192 and its opposite end engaging the wall of the slot 172 in bar 171, the bar 169 will also be retracted. If it is desired to have the bar 171, rod 173, stem 178, and roller 186 projected constantly by said spring 185, the pin 187 will be pulled out of engagement in the slot 172 by the handle 196 and will be held so by the spring latch 189 engaging in the other groove 188. Also, when the handle 196 is retracted, a lug 196' is disengaged from a slot 197' in the boss 198' and turning the handle 196 in either direction permanently locks the pin out of engagement with the slot 172, the lug then resting on the face of the boss 198'.

Referring to Figures 17 and 18, a rod 198 is pivotally mounted on the casing or housing 123 and at one end carries a finger 200, while at the opposite end is provided with a handle 201. When said handle 201 is shifted to the left, as shown in Figs. 7 and 18, the finger 200 is out of the path of movement of the extension plate 175 and the parts are operated as described, but if the handle is rotated to the right, the said finger 200 is moved to the left and occupies a position to be engaged by said extension plate 175, which it will hold constantly in the retracted position shown in Figure 18 for a purpose to be later set forth.

Referring to Figures 16 and 18, the crank shaft 137 at one end carries a flange 210, to which is connected a plate 211 and the adjacent extended portion 212 of the crank shaft 137 is squared and receives a sliding clutch member 213 having a similar squared opening 214 therein, whereby the clutch plate will rotate with the crank shaft but is slidable thereon. A plurality of coil springs 215 have their ends respectively engaged in recesses 216 and 217 in the clutch member 213 and the fixed plate 211, whereby the clutch member is constantly urged in a direction away from the said plate. The extension 218 of the crank shaft has a bushing 219 upon which is mounted for rotation a drive and fly-wheel 220 driven through the medium of a belt 221 from a pulley 222 on a shaft 223 of a suitable electric motor 224. This motor is independently operable by a switch mechanism not shown. Secured to the driving wheel 220 by bolts 225 is a fixed clutch member 226 adapted to engage the clutch member 213 for operating the crank shaft and the stamping and stripping mechanism heretofore described. Carried by the clutch member 213 is a cam 227 as shown in Figures 16 and 18, the purpose of which will now be described in cooperation with the roller 186 and its associated mechanism.

When the roller 186 is retracted as shown in Figure 18 as when the cams 167 and 170 are in engagement or when the finger 200 is in a position to engage the extension plate 175 and maintain the roller constantly retracted, the clutch members will be in engagement by reason of the springs 215. Under such conditions, the reciprocating head 131 would be constantly reciprocated. However, it is desirable that when the head 131 reaches the limit of its upward movement at the end of each stamping operation, that it pauses for a period long enough to permit the strip material which has been stamped to slide to the stripper apparatus and the unstamped material upon the table 121 to slide into a position to be stamped. To hold the head 131 therefore, the roller 186 engages the cam 227 mounted on the rotating clutch member 213 at a point in the rotation of clutch member 213 when the head 131 is at the limit of its upward movement, and this engagement of the roller and cam disengages the clutch members by retracting the clutch member 213 to stop rotation of the crank shaft. That is, the roller 186 and cam 227 cooperate to move the clutch 213 away from the fixed clutch 220 whereby the crank shaft 137 ceases to rotate and the head 131 is held in its upward position for a limited period based on the speed of rotation of the combining rolls 96 which feed and propel the strip material to the stamping and stripping apparatus. The time period at which the cams 167 and 170 engage each other and pull the roller 186 off of the cam 227 to permit reengagement of the clutch members and rotation of the crank shaft with operation of the stamping and stripping mechanism is timed from the combining apparatus B by reason of the connection of the sprocket wheel 160 with the rotating disc 166 carrying cam 167, i. e., the combined drive between the rolls 96 and the clutch control mechanism illustrated in Figures 18 and 19. Thus, since material is being constantly fed or propelled by the rollers 96 of the combining mechanism, when the cams 186 and 227 are engaged so as to release the clutch members, a precise but brief period elapses thereafter between this engagement and the engagement of the cams 167 and 170 to withdraw the roller and again release the roller 186 onto the path of movement of cam 227; such period is of a duration that a proper length of material may be fed to the stamping and stripping apparatus before the reciprocating head 131 resumes its reciprocation. It will be understood that the roller 186 engages the cam 227 to release the clutch members at a single point in the rotation of the clutch member 213 and that the holding period or pause for the head 131 at the limit of its upward movement is controlled by the elapsed period thereafter before the engagement of the cams 167, 170 when the roller 186 is retracted and the clutch members again engage to rotate the crank shaft and reciprocate the stamping and stripping devices.

As stated, the clutch members may be continuously maintained in engagement as where the stamping and stripping instrumentalities are intermittently or manually fed, by shifting the lever 198, or said clutch members may be maintained constantly unclutched by retracting the pin 187 from the slot 172.

As will be understood, the operation of the combining apparatus and stamping-stripping apparatus is synchronized in that reciprocation of the latter is directly controlled by the clutch which in turn is controlled by cam disc 166—167 driven from the combining apparatus. This assures accurate timing of the reciprocating with the feed of the combining rolls. Thus, the stamping instrumentality is prevented from overrunning with respect to the amount of material fed to the combining rolls which might strain and break the strip or result in underfeeding of the strip. Also overfeeding is thereby avoided and the correct slack, i. e., amount of material between the combining and stamping units is maintained.

Since rotation of the crank shaft is discontinued once during each rotation thereof, i. e., at the point where the roller 186 and cam 227 are engaged for a brief period, in order to prevent any overthrow of the reciprocating head 131 of the machine, I provide at one end of the crank shaft a friction brake comprising a brake wheel 230 secured to the reduced end 231 of the shaft. A suitable friction shoe 232 is attached to a projection 233 on the fixed head 128 as by bolts 234 and carries a friction material or band 235 which engages the surface of the brake wheel 230. In this manner the crank shaft is subjected to a continuous braking action.

Referring to Figure 20, I have illustrated a supplemental positive synchronous means for feeding the strip material to the stamping and stripping instrumentalities. This means comprises a gear segment 240 adjustably secured to the outer face of the rotating disc 166 by a slotted bolt connection 241. Mounted in bracket bearings 242 fixed to the casing 123 is an angularly disposed shaft 243 having at one end a gear 244 meshing with the segment gear 240 and at its opposite end a gear 244', meshing with a gear 245 on the lower of a pair of feed roller carrying shafts 246 carrying feeding rollers 247. The shafts 246 have respectively fixed thereto meshing gears 247' whereby the shafts and rollers are rotated intermittently for a definite timed period. This rotation of the rollers 247 is obtained by the segmental gear 240 on the rotating disc 166, engaging the gear 244 whereby the shaft 243 is turned and the engagement of the gears 244' and 245 rotates the lower roller shaft 246 and the roller carried thereby with simultaneous rotation of the upper shaft 246 and its roller through the engagement of the gears 247'. The roller shafts 246 and rolls 247 are disposed one above and one below the surface of the table 121 as shown in Figure 20, the table being cut away at 248 whereby the rolls 247 are cooperable to engage opposite surfaces of the strip material propelled over the table 121 by the combining instrumentality. The shafts 246 rotate in suitable bearings 249 which externally have the form of blocks 250 adjustably retained in superposed relation in U-shaped housings 251 secured to the cover 122 and having their bases resting upon integral extensions 252 thereof. A suitable cover 253 is bolted or otherwise secured to the tops of the housings 251.

Figure 21:
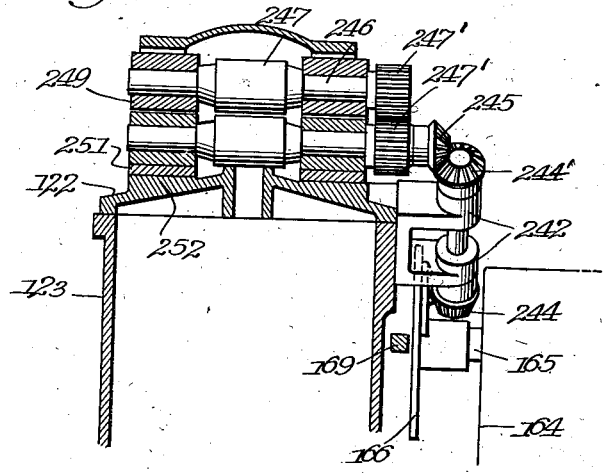
Figure 21 is a sectional view on the line 21—21 of Figure 20.

In this manner, a positive intermittent feed for the strip material is provided supplementing the action in this respect of the combining mechanism. The construction in Figures 20 and 21 provides an intermittent feed to an intermittently operated stamping-stripping means. The feed obtained through the medium of the rolls 247 is synchronized with the combining mechanism on the one hand and with the reciprocating means for the movable head 131 on the other, whereby rotation of the feeding rolls 247 to feed the strip takes place immediately the head 131 reaches the limit of its upward movement and continues throughout its pause in that position, the feeding being discontinued when the cams 167 and 170 are in engagement to retract the roller 186 and permit the clutch members to engage and the reciprocating head 131 to resume its movement. In this connection, the segment is of an area and is so disposed relative to the position of the cam 167 on the rotating disc 166 that in the operation of the machine, a sufficient period of time will be allowed for the feeding of the strip material to the stamping and stripping instrumentalities while the head 131 is held in its upward position, before the roller 186 is disengaged from the clutch cam 227. This synchronous and positive feeding of the strip material as will be observed is supplementary to that of the combining rolls. In each case, of course, these means provide for a sufficient flexing of the material or collecting of the material as will allow the continuous operation of the forming means A, the combining means B and the stamping and stripping instrumentalities C, D, whereby products are formed without interruption.

Referring to Figure 1 of the drawings, I have indicated at 260 a pair of spray means, for depositing a layer of non-sticking material such as graphite upon the exposed surface of the cushion gasket material G as it leaves the reels 75 and is passed to the combining apparatus. This spray means is mounted upon the bracket 72 or the bracket 85 as desired. In lieu of having a spray means, suitable rollers carrying the non-sticking material or other spreading means may be utilized to spread and apply the non-sticking material film to the exposed surface of the gasket material layers. Instead of applying the non-sticking layer to the material as it leaves the reels 75, this may be accomplished by similar means interposed between the combining apparatus and the throat 120, the same being attached to the yokes or U-shaped members 92. Again this non-sticking material applying means may be applied while the material is passed over the table 121 or while it is moving from the rolls 247. In some cases, the non-sticking layer may be applied after the material leaves the throat 125 and before it enters the stamping and stripping apparatus. Again the procedure of applying a non-sticking layer may take place after the gaskets have been stamped and recovered from the chute 149 and prior to introduction to the bath E and oven F. It will be understood of course that the rolled material itself will have in some cases applied to it a layer of non-sticking material, and hence, in some instances the use of the means for subsequently applying the non-sticking layer will not be operated. Where the non-sticking layer, however, is applied after the strip material leaves the reels 75, any of the above recited procedures may be followed, and attention is directed to applicant's copending application, Serial No. 648,691 of which this application is a continuation in part, and in which the procedure therein outlined including that of applying the non-sticking layer is followed where desired in the present case.

I have stated that the prime movers for the cutting instrumentality, the combining instrumentality and the stamping and stripping instrumentality, namely, the electric motors, are independently operable so that the same may be shut off independently whenever desired. In this connection, however, the independence of the several prime movers is of considerable importance in that they may be controlled and synchronized to adjust the speed of the several instrumentalities with respect to each other whereby a smooth continuous and uninterrupted manufacturing process is possible. If desired, however, a single prime mover may be utilized for operating all of the mechanisms, it being desirable, however, to synchronize the feed of strip material from the combining apparatus B and the intermittent operation of the stamping and stripping instrumentalities C—D.

In the operation of the invention, strip material M is drawn by the cutting instrumentality A through the same and the metallic strip is formed with projections or protuberances and projections on one or both sides thereof as in my aforesaid patents, and as shown in Figures 4 and 5 hereof. The cutting instrumentality A not only draws the material from the reel 12 but propels the same forward in the machine and after the cutting and forming operation, the sheet is cleaned and dried by reason of the blast from the conduit 42. Simultaneously with the entrance of the formed metal strip material into the throat 81, one or more layers of cushion gasket material G is likewise drawn into the throat in combining relation with said metal strip, the cushion material being drawn from the reels 75 by the combining rolls which of course also act to draw the associated strips in combining relation. In the combining rolls, the strip material is compressed and/or combined as in Figures 4 and 5 and thereafter passes over the elongated table 121 being propelled toward the stamping and stripping instrumentality by the combining rolls. The purpose of the table 121 and/or rolls 247 is to take care of the slack occurring while the strip material is being stamped and stripped thereby permitting continuous forming of the metal and compression and/or combining of the layers and feeding of the material to the stamping and stripping machine without stoppage of the operation. The intermittent operation of the stamping and stripping machine is synchronized with the speed of feed of the combining rolls 96 and the material is fed into stamping position while the reciprocating die block 131 is held in the limit of its upward movement. As each stamping operation takes place, the material is moved to the right and successive blank portions of the strip are fed into stamping position. At the same time, the stamped material is fed into stripping position following each successive stamping, the whole procedure being continuous and without interference with the continuous feeding of strip material from the combining apparatus. In the stripping apparatus as stated, the knock-out pins 145 push out from the strip severed portions, which it is desired to recover, and these are recovered from the first chute 149; the knock-out block 145 simultaneously knocks out the gaskets which are recovered through the second chute 149; while the knife 153 shears the waste strip and the same is collected from the end chute 149.

If the cushion material G already carries a coating of non-sticking material, means 260 for applying the same are not operated but where the cushion gasket material is not so coated, then these means are operated as stated in advance of the combining operation or subsequent thereto as above described.

The gaskets from the chute 149 are immediately conveyed to the conveyor 251 or stored and subsequently placed on the conveyor whereby they are carried through the bath E containing a suitable liquid coating material for producing on the surface of the gasket including the edges thereof, an abrasion resistant relatively hard film or layer of desired thickness and preferably relatively thin and which film is resistant to the various chemical and physical factors surrounding gasket use and will bind the fibres together as well as protect the non-sticking surface such as graphite. The tank E will contain one or a mixture of various adhesive compositions such as silicate of soda or water glass, shellac, liquor or varnish mixtures which are air drying or which can be dried by means of an elevated temperature, e. g., the oven F. The film formed by immersion in the tank E is likewise non-sticky and preserves the gasket during storage, shipment and use. The conveyor 261 while it is shown diagrammatically as being substantially flush with the stripper plate 151 can be so positioned, but is preferably disposed below the same and the central chute 149 communicates with the conveyor to deposit the gaskets thereon as they are delivered from the stripping instrumentality. In this manner, the dipping and coating of the gasket and the heat treating thereof where necessary are continuous with the preceding operations of gasket manufacture. The motor for operating the conveyor 251, not shown, is independently operable, although as heretofore stated, a single prime mover may be used to actuate all of the apparatus. Preferably, however, the conveyor is synchronized in its movement with the operation of the stripping instrumentality, whereby the hook members 262 of the conveyor will each pick up a gasket as delivered from the chute and carry the gaskets as successively formed through the tank E and oven F.

The apparatus is of such character that it can be positioned in a straight line, thereby greatly facilitating the procedure and simplifying the structure as well as the cost of manufacture and expense of operation. All of the housings or casings are formed as a single casting with which the various operating instrumentalities supported on the casting are detachably connected so that they can be removed or replaced as required, either due to wear or the type of material, structure of gasket or contour and form of product being made. Of course the several housings and castings may be separable and bolted or otherwise united together if desired. Stated briefly, a single base may be utilized for supporting all of the instrumentalities which are arranged in a straight line or individual bases may be employed.

I have referred herein to the use of a single prime mover for each of the several apparatus and with such a construction suitable adjustable or regulable connections to each apparatus are desirable in order that they may be synchronously and/or selectively actuated and assure continuous and uninterrupted operation of the machine, i. e., so that the strip material will be continuously acted on and the final products continuously formed.

Also, while I have shown the intermittent positive feeding rolls disposed in advance of the stamping or cutting machine, e. g., at the table 121, they may be positioned following the stripping apparatus and thereby intermittently draw the strip material into stamping and stripping positions and the waste from the machine. In such case, of course, rolls 247 will be mounted on a casing or bracket of suitable support and operated as described above, and the knife 153 will then also be positioned to engage the stripped material and shear the same after it comes from the rolls 247. Any suitable reciprocating support, preferably but not necessarily connected to the head 131 and extension thereof 143 so as to be operable therewith may be employed. On the other hand, a suitably intermittently actuated reel operated from any source or means, e. g., from the shaft 243 and connected to either a separate gear thereon or either of the gears 244, 244', 245 or 247' may be employed to wind up the stripped material drawn through the rolls 247 in which event knife 153 will not be employed.

I claim:

1. An apparatus of the class described comprising feeding rolls, means for operating the same continuously to feed strip material to a cutting instrumentality, a reciprocating cutting instrumentality, means including a prime mover and a clutch for operating the cutting instrumentality to cut strip material fed thereto, and means actuated by the feeding means to disconnect the clutch and provide a dwell in the reciprocation of the cutting instrumentality when the cutting instrumentality is free of the strip.

2. An apparatus in accordance with claim 1 which includes a supplemental feeding instrumentality, and means actuated by the first-mentioned feeding means to intermittently operate the supplemental feeding means.

GEORGE T. BALFE.